US011230629B2

(12) United States Patent
Chieng et al.

(10) Patent No.: US 11,230,629 B2
(45) Date of Patent: Jan. 25, 2022

(54) METHOD OF MAKING A POLYMER ARTICLE AND RESULTING ARTICLE

(75) Inventors: Diing Yaw Chieng, Puchong (MY); Hung Than Mar, Kuala Lumpur (MY)

(73) Assignee: Nobel Scientific SDN. BHD., Wilayah Persekutuan (MY)

( * ) Notice: Subject to any disclaimer, the term of this patent is extended or adjusted under 35 U.S.C. 154(b) by 247 days.

(21) Appl. No.: 14/379,355

(22) PCT Filed: Feb. 29, 2012

(86) PCT No.: PCT/MY2012/000039
§ 371 (c)(1),
(2), (4) Date: Aug. 18, 2014

(87) PCT Pub. No.: WO2013/129905
PCT Pub. Date: Sep. 6, 2013

(65) Prior Publication Data
US 2015/0010745 A1 Jan. 8, 2015

(51) Int. Cl.
| | | |
|---|---|---|
| *C08J 5/02* | (2006.01) |
| *C09D 119/02* | (2006.01) |
| *C08L 15/00* | (2006.01) |
| *C09D 115/00* | (2006.01) |
| *C08K 5/16* | (2006.01) |
| *B29C 41/00* | (2006.01) |
| *B29C 41/14* | (2006.01) |
| *B29C 41/42* | (2006.01) |
| *C08K 3/22* | (2006.01) |
| *C08K 3/28* | (2006.01) |
| *C08K 5/05* | (2006.01) |
| *B29K 33/18* | (2006.01) |
| *B29L 31/48* | (2006.01) |
| *B29L 31/00* | (2006.01) |
| *C08C 19/22* | (2006.01) |

(52) U.S. Cl.
CPC ............. *C08J 5/02* (2013.01); *B29C 41/003* (2013.01); *B29C 41/14* (2013.01); *B29C 41/42* (2013.01); *C08C 19/22* (2013.01); *C08K 3/22* (2013.01); *C08K 3/28* (2013.01); *C08K 5/05* (2013.01); *C08K 5/16* (2013.01); *C08L 15/00* (2013.01); *C09D 115/005* (2013.01); *C09D 119/02* (2013.01); *B29K 2033/18* (2013.01); *B29L 2031/4864* (2013.01); *B29L 2031/768* (2013.01); *C08J 2313/00* (2013.01); *C08J 2379/00* (2013.01); *C08K 2003/2241* (2013.01)

(58) Field of Classification Search
CPC .... C08K 5/16; C08K 5/29; C08L 7/00; C08L 7/02; C08L 9/00; C08L 9/02; C08L 9/04; C08L 9/06; C08L 9/08; C08L 9/10; C08L 11/00; C08L 11/02; C08L 13/00; C08L 13/02; C08L 15/00; C08L 15/005; C08L 15/02; A61B 42/00; A61B 42/10; A61F 6/04; C08J 3/24; C08J 3/26; Y10T 428/24942; Y10T 428/2495; Y10T 428/24967; Y10T 428/24975; Y10T 428/26; Y10T 428/263; Y10T 428/264; Y10T 428/265; Y10T 428/266; Y10T 428/268; Y10T 428/269
USPC ....... 428/212, 213, 215, 216, 220, 332, 334, 428/335, 336, 337, 338, 339
See application file for complete search history.

(56) References Cited

U.S. PATENT DOCUMENTS

| | | | | |
|---|---|---|---|---|
| 3,639,353 A | * | 2/1972 | Brown ..................... | C08L 79/00 525/907 |
| 4,670,330 A | * | 6/1987 | Ishiwata ............ | A41D 19/0062 2/167 |
| 5,126,235 A | | 6/1992 | Hioki | |
| 5,798,175 A | * | 8/1998 | Tynan, Jr. .............. | C09J 121/00 428/355 EN |
| 5,997,969 A | * | 12/1999 | Gardon .............. | A41D 19/0055 428/35.7 |
| 6,021,524 A | * | 2/2000 | Wu ..................... | A41D 19/0058 2/168 |
| 6,031,042 A | * | 2/2000 | Lipinski ..................... | C08J 5/02 524/556 |
| 6,451,893 B1 | | 9/2002 | Tao | |
| 2002/0114943 A1 | | 8/2002 | Warneke et al. | |
| 2003/0017286 A1 | * | 1/2003 | Williams ............... | A61B 42/00 428/35.2 |
| 2003/0088030 A1 | | 5/2003 | Haberle et al. | |

(Continued)

FOREIGN PATENT DOCUMENTS

| | | |
|---|---|---|
| CN | 1954000 A | 4/2007 |
| CN | 102015804 A | 4/2011 |

(Continued)

OTHER PUBLICATIONS

Derwent Acc-No. 2013-N12322 corresponding to WO 2013/129905 A1. (Year: 2019).*
International Written Opinion for International Application No. PCT/MY2012/000039 dated Sep. 14, 2012, 9 pages.
Wang, Zhen, Dictionary of Chemical Technology, Chemical Industry Press, Second Edition, (Apr. 1985), 5 pages.
Zhang et al., Techniques for Modifying Rubber, Butyronitrile Rubber, China Machine Press, Chapter 3 (2006), 4 pages.
PCT International Search Report, International Application No. PCT/MY2012/000039, dated Sep. 14, 2012, seven (7) pages.
PCT International Preliminary Report on Patentability, International Application No. PCT/MY2012/000039, six (6) pages.
Australian Examination Report for Application No. 2012371722 dated Sep. 23, 2015, 2 pages.

(Continued)

*Primary Examiner* — Maria V Ewald
*Assistant Examiner* — Ethan A. Utt
(74) *Attorney, Agent, or Firm* — TraskBritt

(57) ABSTRACT

A method of making a polymer article comprises the steps of making a polymer solution by mixing a first compound containing carbodiimide groups with a second compound containing carboxylated groups, applying the polymer solution to a former, wherein the step of applying occurs within 2 hours of the making of the polymer solution, and curing the polymer solution. The polymer solution can have a pH adjuster consisting of ammonium hydroxide.

24 Claims, No Drawings

(56) References Cited

U.S. PATENT DOCUMENTS

| | | | |
|---|---|---|---|
| 2003/0152790 A1* | 8/2003 | Halladay | C09D 115/005 |
| | | | 428/500 |
| 2003/0220462 A1* | 11/2003 | Porzio | C08L 79/08 |
| | | | 528/44 |
| 2004/0068036 A1* | 4/2004 | Halladay | C09D 115/005 |
| | | | 524/439 |
| 2004/0132886 A1 | 7/2004 | Tao et al. | |
| 2004/0180044 A1 | 9/2004 | Chao et al. | |
| 2006/0057320 A1* | 3/2006 | Huang | C08K 5/3492 |
| | | | 428/35.7 |
| 2009/0105424 A1 | 4/2009 | Kodama et al. | |
| 2011/0183875 A1 | 7/2011 | Soddemann et al. | |

FOREIGN PATENT DOCUMENTS

| | | |
|---|---|---|
| EP | 0 121 083 A1 | 10/1984 |
| EP | 1 669 395 B1 | 5/2008 |
| JP | H08081545 A | 3/1996 |
| JP | 11-60667 A | 3/1999 |
| JP | 2003268050 A | 9/2003 |
| JP | 2005200559 A | 7/2005 |
| JP | 2008525575 A | 7/2008 |
| JP | 2008-291222 A | 12/2008 |
| JP | 2009138194 A | 6/2009 |
| JP | 5315838 | 10/2013 |
| JP | 5315838 B2 | 10/2013 |
| WO | 99/29773 A1 | 6/1999 |
| WO | 200073367 A1 | 12/2000 |
| WO | 2001081456 A | 11/2001 |
| WO | 03/076537 A1 | 9/2003 |
| WO | 2011/068394 A1 | 6/2011 |
| WO | WO-2013129905 A1 * | 9/2013 ............ C08C 19/22 |

OTHER PUBLICATIONS

Chinese Office Action for Chinese Application No. 201280070601 dated Nov. 2, 2015, 19 pages.
Chinese Office Action for Chinese Application No. 201280070601 dated Jun. 2, 2016, 19 pages.
Chinese Office Action for Chinese Application No. 201280070601 dated Nov. 4, 2016, 21 pages.
European Examination Report for European Application No. 12713802.2 dated Nov. 4, 2015, 3 pages.
Japanese Notification of Reasons for Refusal for Japanese Application No. 2014-559850 dated Sep. 28, 2015, 9 pages.
Japanses Notification of Reasons for Refusal for Japanese Application No. 2014-559850 dated Jul. 13, 2016, 13 pages.
Japanese Search Report of Japanese Application No. 2014-559850 dated Sep. 24, 2015, 22 pages.
Canadian Office Action for Canadian Application No. 2,864,708, dated Jan. 15, 2018, 3 pages.
Japanese Decision of Refusal for Japanese Application No. 2014-559850 dated May 2, 2017, 12 pages.
Korean Notification of Reason for Refusal for Korean Application No. 10-2014-7026198, dated Jun. 30, 2017, 4 pages.
Korean Written Opinion for Korean Application No. 10-2014-7026198, dated Aug. 31, 2017, 4 pages.
Examination Report for United Kingdom Application No. GB1416341.4 dated Mar. 11, 2020, 2 pages.
Korean Notification of Reason for Refusal for Korean Application No. 10-2014-7026198, dated Nov. 23, 2017, 4 pages with English Translation.
Chinese First Office Action for Chinese Application No. 201910315360.3, dated Aug. 6, 2021, 10 pages with translation.
Chinese Search Report for Chinese Application No. 201910315360.3, dated Aug. 6, 2021, 2 pages.
Xie et al., Handbook of Rubber Industry, Chemical Industry Press Co., Ltd., (Sep. 30, 1989), 6 pages.

* cited by examiner

METHOD OF MAKING A POLYMER ARTICLE AND RESULTING ARTICLE

CROSS-REFERENCE TO RELATED APPLICATIONS

This application is a national phase entry under 35 U.S.C. § 371 of International Patent Application PCT/MY2012/000039, filed Feb. 29, 2012, designating the United States of America and published in English as International Patent Publication WO2013/129905 A1 on Sep. 6, 2013, the disclosure of which is hereby incorporated herein in its entirety by this reference.

FIELD OF THE INVENTION

This invention relates to methods of making polymer articles and the resulting articles, and more particularly to methods for reducing time and costs of making such articles.

BACKGROUND OF THE INVENTION

Polymer articles can be made from a number of materials and in a number of ways. Typically organic compounds in a liquid form are mixed together in a process where cross-linking of the compounds occurs to form solid elastomeric polymer articles. Known processes are relatively energy and time consuming, and can comprise dip coating and injection molding, for example. In particular, known processes for making polymer articles have a maturation step after reacting compounds together which normally takes several days. Further cross-linking through a vulcanizing step can be relatively slow. Moreover, many processes for making polymer articles comprise a leaching step where surface impurities are removed which can also be relatively time consuming. All these steps increase costs required to make polymer articles.

It would be desirable to provide an improved method of making polymer articles, which reduces costs by reducing time required for manufacture, including reducing the amount of time for maturing, vulcanizing and leaching. It would also be desirable to provide polymer articles, which provide reduced susceptibility to chemical allergies.

SUMMARY OF THE INVENTION

In accordance with a first aspect, a method of making a polymer article comprises the steps of making a polymer solution by reacting a first compound containing carbodiimide groups with a second compound containing carboxylated groups, applying the polymer solution to a former, wherein the step of applying occurs within 2 hours of the making of the polymer solution, and curing the polymer solution. The polymer solution can have a pH adjuster consisting of ammonium hydroxide.

From the foregoing disclosure and the following more detailed description of various embodiments it will be apparent to those skilled in the art that the present invention provides a significant advance in the technology of making polymer articles. Particularly significant in this regard is the potential the invention affords for providing high quality polymer articles at much lower costs. Additional features and advantages of various embodiments will be better understood in view of the detailed description provided below.

DETAILED DESCRIPTION OF CERTAIN EMBODIMENTS

It will be apparent to those skilled in the art, that is, to those who have knowledge or experience in this area of technology, that many uses and design variations are possible for the making of polymer articles disclosed here. The following detailed discussion of various alternate features and embodiments will illustrate the general principles of the invention with reference to making thin wall polymer articles. Other embodiments suitable for other applications will be apparent to those skilled in the art given the benefit of this disclosure.

The present invention relates to methods of making polymer articles. Representative examples of polymer articles which can be made using the process described herein comprise medical, surgical and/or laboratory gloves and condoms. Other suitable polymeric articles will be readily apparent to those skilled in the art given the benefit of this disclosure. Advantageously, polymer articles made by the processes disclosed herein can be free of cross-linking agents such as sulphur, zinc oxide, stearic acid and accelerators such as carbamates, thiazoles, thiurams, thioureas, sulphenamides, xanthates, guanidines and their derivatives.

In accordance with one embodiment, a method of making a polymer article comprises making a polymer solution by mixing a first compound containing carbodiimide groups with a second compound containing carboxylated groups. The polymer solution is applied to a former, and the polymer solution is cured. In accordance with a highly advantageous feature, the polymer solution can be applied to the former within 2 hours of the making of the polymer solution, greatly decreasing total manufacturing time.

As used herein, the term "polymer" is a large molecule comprising repeating structural units and can be an elastomeric polymer or latex which includes homopolymers, copolymers, terpolymers and modifications thereof, including mixtures of polymers. The term polymer solution is a mixture of at least a first compound containing carbdoiimide groups and a second compound containing carboxylated groups, along with any necessary solvents. A polymer article is an article formed as a result of the processes disclosed herein, such as a pair of gloves.

Suitable examples of first compounds with carbodiimide groups comprise, for example, mono-, di-, tri-, tetra-, oligo- or poly-carbodiimides, aliphatic or aromatic, and mixtures thereof, having a functional carbodiimide group —N=C=N—. Examples of suitable mono-carbodiimides include, but are not limited to dicyclohexylcarbodiimide, diisopropylcarbodiimide, dimethylcarbodiimide, diisobutylcarbodiimide, di-t-butylcarbodiimide, t-butylisopropylcarbodiimide, dioctylcarbodiimide, diphenylcarbodiimide, N,N'-Bis(2-methylphenyl)carbodiimide, 1,3-Di-p-tolylcarbodiimide, di-β-naphthylcarbodiimide, ethyl-3-(3-dimethylaminopropyl)carbodiimide, 1,3-Bis(Trimethylsilyl)carbodiimide, N-(tert-butyl)-N'-(2,6-dichlorophenyl) carbodiimide, N-(tert-butyl)-N'-(1-(2-chlorophenyl)-1-methylethyl)carbodiimide and N-butyl-N'-(1-(2-chlorophenyl)-1-methylethyl)carbodiimide. Examples of suitable poly-carbodiimides comprise, for example, polycarbodiimides terminated with aromatic, aliphatic or alicyclic diisocyanates and mixtures thereof, for example, tetramethylxylylene diisocyanate, isophorone diisocyanate, 4,4'-dicyclohexylmethane diisocyanate, toluene-2,4-diisocynate, toluene-2,6-diisocyanate, diphenylmethane-4,4-diisocyanate, 1,4-phenylene-diisocynate, dicyclohexylmethane-4,4'-diisocynate, 3-isocyanatomethyl-3,3,5- trimethylcyclohexylisocynate, 1,6-hexyldiisocynate, 1,4-cyclohexyl-diisocynate, norbonyldiisocynate, 1,5-naphthylene diisocyanate, 4,4-diphenyldimethylmethane diisocyanate, 1,3-phenylene diisocyanate, hexamethylene diisocyanate, xylylene diisocyanate, and methylcyclohexane diisocyanate. Other suitable carbodiimides will be readily apparent to those skilled in the art given the benefit of this disclosure.

Suitable examples of second compounds containing carboxylate groups comprise, for example, modified natural rubber latex, synthetic polymers such as acrylonitrile butadiene, isoprene, styrene, chloroprene, ethylene, vinyl chloride and copolymers, blends and mixtures thereof. The carboxylate groups in the polymer comprise, for example, carboxylic acid such as prop-2-enoic acid, 2-methylpropenoic acid, 2-methylidenebutanedioic acid, (Z)-butenedioc acid, (E)-butenedioic acid and (E)-but-2-enoic acid, or an anhydride thereof with a prop-2-enoic ester such as methyl-, ethyl-, butyl-, 2ethylhexyl- and 2-hydroxyethyl propenoates, or an acrylic monomer other than prop-2-enoic acid such as acrylamide and acrylonitrile, or a-methylstyrene, vinyl acetate or the like. In an example, the second compound can be an acrylonitrile with 2-methylpropenoic acid terpolymer, with an amount of 2-methylpropenoic acid equivalent of about 1 to 10% by dry weight of the base polymer, preferably 2 to 7% by dry weight of the base polymer. Other suitable polymers with carboxylate groups will be readily apparent to those skilled in the art given the benefit of this disclosure.

The polymer solution comprises a mixture of the first compound having carbodiimide groups, a second compound having carboxylate groups and water, such as demineralized water. In accordance with a highly advantageous feature, a weak alkali as a pH adjuster may also be present in the polymer solution. The weak alkali can comprise, for example, ammonium hydroxide at about a 5-10% concentration by weight of a total weight of the solution. The polymer solution may also include additives such as antioxidants such as butylated reaction product of p-cresol and cyclopentadiene (BPC), anti-ozonants such as a paraffin wax, mineral fillers, lubricants, reodorants, colorants, biocides, thickeners, defoamers, wetting agents, pigments such as titanium dioxide.

In accordance with a highly advantageous feature, the polymer solution can be mixed under mild conditions, such as 30-40° C. under slow agitation for less than two hours, or less than one hour, or even less than thirty minutes. Therefore the step of applying the polymer solution can occur within two hours, within one hour, or even within thirty minutes of the step of making the polymer solution. This short maturation step eliminates the need for large amounts of the polymer solution to be stored at the manufacturing site for multiple days.

Once the polymer solution is made and ready to be applied, it may be applied to a former. The term "former" is understood broadly to refer to a standard shape former, such as an element to which the polymer solution coats prior to curing and can comprise, for example, a former used in a dip coating process. Depending upon the desired polymer article, surfaces of a mold cavity used in an injection molding process can also serve as the former.

For the dip coating process, prior to the step of dipping former into the polymer solution, a step of pretreating the former is desired. The step can comprise, for example, pretreating the former with a precoat which comprises at least a surfactant, a release agent and an ionic solution. For example, a precoat can comprise a mixture of a precoat first solution 8-20% by weight of the first solution of calcium ions, a precoat second solution of 0.05-0.25% by weight of the second solution of a non-ionic silicone-free surfactant, and a precoat third solution of 0.5-2.5% by weight of the third solution of a pre-homogenized release agent. The former may have the precoat applied (by dipping, for example), and dried at 110-130° C. for 60 seconds or longer. Preferably the former has a surface temperature of about 50-60° C. when the polymer solution is applied to the former.

Once the former is prepared, the polymer solution may be applied to the former. The can be done in one of many different ways. For example, the (optionally precoated) former may be dipped into the polymer solution for a limited period of time (5-20 seconds) at generally ambient conditions, and then dried. Drying may occur in an oven at 110-130° C. for 30-60 seconds. The result is that the former is coated with a wet gel. Optionally, this wet gel may be treated with a mild organic acid to help reduce the pH of the wet gel. Optionally a step of pre-leaching may also comprise dipping the wet gel coated former in warm water. A lubricant may also be applied to the wet gel. The edge of the semi-dried wet gel may be rolled down to form a bead. The bead can help with stripping the polymer article from the former.

In addition to reduced times for maturation, the step of curing the polymer solution can also be reduced. Curing the polymer solution creates an intermediate solid. For example, where first compound is a butadiene acrylonitrile elastomer latex, the curing step can be accelerated, can be performed at lower temperatures and can occur in less than 20 minutes to form a cured carboxylated nitrile latex. More preferably, the step of curing can occur in 8 to 20 minutes, or 12 to 16 minutes in an oven at a temperature of 80-130°, or even 80-90° C.

The intermediate solid or latex, can then be subjected to a step of leaching to remove surface impurities. In accordance with a highly advantageous feature, the time required for the step of leaching can also be reduced since there can be no accelerators, sulphur, zinc oxide or other cross-linking agents to be removed. The step of leaching can occur by dipping the latex into water having a temperature of 50-60° C. for only 50-120 seconds, preferably only 50-70 seconds. Once the step of leaching is completed, the latex may be dried and a resulting polymer article (such as a thin wall article of thickness 0.03 to 0.33 mm, forming a glove, finger cot, condom, balloon, bladder bag, catheter, tubing, rubber band, tourniquet, elastic band, diaphragm, dental dam, sheath, etc.,) may be removed from the former. Optionally the resulting product formed by the above disclosed process may be allowed to set permanently for 12-24 hours in a humidity controlled room.

EXAMPLES 1-5

Polymer articles were made having the formulae set forth in Table 1 were mixed at a temperature of about 30° C. for about 60 minutes. Commercially available compounds containing carboxylate groups (ELx-A, ELx-B, ELx-C, ELx-E and ELx-F) are mixed with a carbodiimide compound (CDI), along with ammonium hydroxide, an antioxidant (butylated reaction product of p-cresol and cyclopentadiene (BPC)), and titanium dioxide ($TiO_2$). The amount of each component of the polymer solution is set forth based upon 100 dry parts by weight of the compound containing the carboxylate groups. Demineralized water was added to the compound to produce a formulation containing 15-20% solids. Clean formers were evenly coated with a precoat, and then with the various polymer solutions of Table 1. The wet gel on the formers was cured at 130° C. for 15 minutes. The cured films were stripped from the formers and conditioned for 24 hrs.

TABLE 1

| Formulation | Ex. 1 | Ex. 2 | Ex. 3 | Ex. 4 | Ex. 5 |
|---|---|---|---|---|---|
| ELx-A | 100 | — | — | — | — |
| ELx-B | — | 100 | — | — | — |
| ELx-C (5-6% MAA) | — | — | 100 | — | — |
| ELx-E | — | — | — | 100 | — |
| ELx-F | — | — | — | — | 100 |
| NH4OH | 1 | 1 | 1 | 1 | 1 |
| CDI eq. 430 | 2 | 2 | 2 | 2 | 2 |
| BPC | 1 | 1 | 1 | 1 | 1 |
| TiO2 | 1 | 1 | 1 | 1 | 1 |

MAA = 2-methylpropenoic acid

The films made according to Examples 1-5 were each tested for tensile strength (TS), elongation, 300% modulus and 500% modulus per ASTM D-412, elongation break (Eb), solvent resistance in toluene (LS-t) and cyclohexanone (LS-c). The results of these tests are shown in Table 2. The results show that the carboxylated compounds were effectively cross-linked using a carbodiimide compound producing polymer articles with high tensile strength and having good chemical resistance to non-polar toluene (<85% linear swell) and polar cyclohexanone (<123% linear swell).

TABLE 2

| Physical Properties | Ex. 1 | Ex 2 | Ex. 3 | Ex. 4 | Ex. 5 |
|---|---|---|---|---|---|
| Thickness, mm | 0.06-0.07 | 0.06-0.07 | 0.06-0.07 | 0.06-0.07 | 0.06-0.07 |
| TS, MPa | 21-23 | 32-37 | 29-35 | 29-37 | 30-37 |
| M300, MPa | 1.8-2.1 | 2.3-2.8 | 1.8-2.3 | 2.1-2.3 | 1.9-2.1 |
| M500, MPa | 4-5.2 | 5.9-8.8 | 4.4-5.9 | 4.5-6.3 | 4-4.6 |
| Eb, % | 700 | 650-700 | 650-700 | 700-750 | 700-750 |
| LS-t, % | 62-68 | — | 73-85 | 50-56 | 65-72 |
| LS-c, % | 100-112 | 100-112 | 104-108 | 115-123 | 108-123 |

Film linear swell in: toluene (LS-t); cyclohexanone (LS-c).

EXAMPLES 6-9

Thin wall polymer articles were made using the same method as in Example 1, but from formulations with various types of carbodiimide compounds (CDI) at 5 parts/100 of carboxylated compound as shown in Table 3. The film characteristics are as shown in Table 4. The results show that the carbodiimide compound crosslinks effectively with the compound containing carboxylate groups to produce thin wall polymer articles with high tensile strength. The polymer articles are chemically stronger towards both polar and non-polar solvents at a higher dosage of CDI as compared to that of Examples 1-5.

TABLE 3

| Formulation | Ex. 6 | Ex. 7 | Ex. 8 | Ex. 9 |
|---|---|---|---|---|
| ELx-C 5.5% MAA | 100 | 100 | 100 | 100 |
| NH4OH | 1 | 1 | 1 | 1 |
| CDI eq. 445 | 5 | — | — | — |
| CDI eq. 590 | — | 5 | — | — |
| CDI eq. 385 | — | — | 5 | — |
| CDI eq. 430 | — | — | — | 5 |
| BPC | 1 | 1 | 1 | 1 |
| TiO2 | 1 | 1 | 1 | 1 |

Eq = carbodiimide equivalent, chemical formula weight for 1 mole of carbodiimide group. For example, CDI eq. 430 means 1 mole of the carbodiimide group in the polycarbodiimide polymer chain has an average weight of 430 g.

TABLE 4

| Physical Properties | Ex. 6 | Ex. 7 | Ex. 8 | Ex. 9 |
|---|---|---|---|---|
| Thickness, mm | 0.06-07 | 0.06-0.07 | 0.06-0.07 | 0.06-0.07 |
| TS, MPa | 28-36 | 35-37 | 34-40 | 35-40 |
| M300, MPa | 3.6-4.7 | 1.9-2.6 | 4.1-5.4 | 5.5-7.5 |
| M500, MPa | 12.7-25 | 4.1-5.6 | 32-38 | 28-36 |
| Eb, % | 500-550 | 650-700 | 500-550 | 500-550 |
| LS-t, % | 40-52 | 40-52 | 40-52 | 40-52 |
| LS-c, % | 81-85 | 96-108 | 73-77 | 77 |

Film linear swelling in: toluene (LS-t); cyclohexanone (LS-c).

EXAMPLES 10-15

Thin filmed polymer articles were made using the same method as in Example 1, but from formulations with varying dosage of CDI with Eq. 430, as shown in Table 5. Polymer article characteristics are as shown in Table 6. The results show that CDI could be used at about 1 to 15 parts per 100 of the carboxylated compound to produce thin films with various levels of chemical resistance. The data also show that the breakthrough leak time of the polar solvent through the elastomeric film were more than 330 minutes.

TABLE 5

| Formulation | Ex. 10 | Ex. 11 | Ex. 12 | Ex. 13 | Ex. 14 | Ex. 15 |
|---|---|---|---|---|---|---|
| ELx-C 5.5% MAA | 100 | 100 | 100 | 100 | 100 | 100 |
| NH4OH | 1 | 1 | 1 | 1 | 1 | 1 |
| CDI eq. 430 | 1 | 2 | 3 | 5 | 10 | 15 |
| BPC | 1 | 1 | 1 | 1 | 1 | 1 |
| TiO2 | 1 | 1 | 1 | 1 | 1 | 1 |

TABLE 6

| Physical Properties | Ex. 10 | Ex. 11 | Ex. 12 | Ex. 13 |
|---|---|---|---|---|
| Thickness, mm | 0.07-0.08 | 0.07-0.08 | 0.07-0.08 | 0.07-0.08 |
| TS, MPa | 27-41 | 29-35 | 30-44 | 30-35 |
| M300, MPa | 1.5-2.1 | 1.8-2.3 | 2.6-4 | 4.8-5.1 |
| M500, MPa | 2.7-5.1 | 4.4-5.9 | 9.5-16.5 | 19-20 |
| Eb, % | 700-750 | 650-700 | 600-650 | 550-600 |
| LS-t, % | — | 73-85 | — | 40-52 |
| LS-c, % | 123-135 | 100 | 85-88 | 77-88 |
| LS-h, % | 0-4 | 0-4 | 0-4 | 0-4 |
| LS-a, % | 42-50 | 35-48 | 35-42 | 27-35 |
| BT-c, min | — | — | — | >360 |

| Physical Properties | Ex. 14 | Ex. 15 |
|---|---|---|
| Thickness, mm | 0.09-0.1 | 0.08-0.09 |
| LS-t, % | 40-44 | 40-44 |
| LS-c, % | 68-72 | 64-68 |
| LS-h, % | 0-4 | 0-4 |
| LS-a, % | 30-38 | 30-38 |
| BT-c, min | >334 | >330 |

Film linear swell in: toluene (LS-t); cyclohexanone (LS-c); hexane (LS-h); acetone (LS-a)
BT-c = breakthrough time of cyclohexanone through the elastomeric film.

COMPARATIVE EXAMPLES

EXAMPLE 16

Elastomeric films were made using accelerator-free and sulphur-free formulation adopted from the Example in US Patent Publication 2002/0114943 A1, as shown in Table 7.

Zinc oxide (ZnO) was used to crosslink the carboxylated latex. Potassium hydroxide solution (KOH) was used to adjust the compound pH to about 9.5.

EXAMPLE 17

Elastomeric films were made using zinc-free formulation adopted from the Example in U.S. Pat. No. 6,451,893, as shown in Table 7. Accelerators zincdi-n-butyldithiocarbamate (ZDBC) and zinc mercaptobenzothiazole (ZMBT) and sulphur were used to crosslink the carboxylated latex. Antioxidant 2,2'-methylene-bis-(4-methyl-6-butylphenol) (MBPC) was incorporated.

EXAMPLE 18

Elastomeric films were made using a conventional formulation comprising of accelerator, sulphur and zinc oxide as shown in Table 7.

EXAMPLE 19

Elastomeric films were made using a self-crosslinking carboxylated nitrile latex (X-NBR-SXL) adopted from WO 2011/068394, as shown in Table 7.

The film characteristics are as shown in Table 8. The physical properties of the films were good, but the chemical resistance of the films was poorer than that of embodiments of polymer articles of the present invention. The breakthrough leak times of cyclohexanone through the films were significantly shorter for the Comparative Examples.

TABLE 7

| Formulation | Ex. 16 | Ex. 17 | Ex. 18 | Ex. 19 |
|---|---|---|---|---|
| ELx-C 5.5% MAA | 100 | 100 | 100 | — |
| X-NBR-SXL | — | — | — | 100 |
| KOH | 1 | 1 | 1 | 1.35 |
| ZnO | 1 | — | 1 | 1.2 |
| ZDBC | — | 1 | 0.5 | — |
| ZMBT | — | 1 | — | — |
| Sulphur | — | 3 | 1 | — |
| BPC | 1 | — | 1 | 1 |
| MBPC | — | 0.5 | — | — |
| $TiO_2$ | 1.5 | 0.5 | 1 | 0.75 |
| Blue pigment | 0.15 | — | — | 0.05 |

TABLE 8

| Physical Properties | Ex. 16 | Ex. 17 | Ex. 18 | Ex. 19 |
|---|---|---|---|---|
| Thickness, mm | 0.09-0.1 | 0.08-0.09 | 0.08-0.1 | 0.1 |
| TS, MPa | 45-46 | 36-43 | 31-47 | 24-25 |
| M300, MPa | 3.8-4.5 | 8.9-9.3 | 2.1-3.6 | 3.1-7 |
| M500, MPa | 10-13.4 | 4.4-6.6 | 4.1-8.3 | 6.9-8.2 |
| Eb, % | 650-700 | 700-750 | 650-750 | 650-750 |
| LS-t, % | 84-88 | 80 | 70-74 | 68-72 |
| LS-c, % | 112-168 | 148 | 120-128 | 120-124 |
| BT-c, min | 8-12 | 15 | 7 | 10-13 |

Film linear swell in: toluene (LS-t); cyclohexanone (LS-c); BT-c = breakthrough time of cyclohexanone through the elastomeric film.

EXAMPLES 20-23

Elastomeric gloves were made using the same formulation as in Example 11, but cured at various temperatures from 80 to 130° C., for 15 minutes. The resulting characteristics are as shown in Table 9. The results show gloves with good physical and chemical resistance properties. The durability challenge shows the CDI crosslinked gloves could be worn for more than 3 hours without breaking down in human sweat under actual laboratory working conditions.

TABLE 9

|  | Ex. 20 | Ex. 21 | Ex. 22 | Ex. 23 |
|---|---|---|---|---|
| Cure temperature | 110° C. | 120° C. | 130° C. | 80° C. |
| Physical Properties |  |  |  |  |
| Thickness, mm | 0.08-0.09 | 0.08-0.09 | 0.08-0.09 | 0.07-0.08 |
| TS, MPa | 36-41 | 34-41 | 35-41 | 36-44 |
| M300, MPa | 3.5-3.8 | 3.5-4 | 3.2-4.6 | 3.9-4.1 |
| M500, MPa | 10.6-12.9 | 8.2-14.8 | 9.2-13.3 | 10.2-11 |
| Eb, % | 600-650 | 600-650 | 600-650 | 650-700 |
| LS-c, % | 82-88 | 85-88 | 84-87 | 83-92 |
| Durability, min | >180 | >180 | >180 | >180 |

Film linear swelling in cyclohexanone (LS-c).
Durability = time taken for a glove to disintegrate, break up or tear (especially at crotches) after wearing under actual working conditions.

EXAMPLES 24-27

Thin filmed polymer articles were made using the same formulation as in Example 11, but dipped at various stages of its pot life from 1 to 168 hours after adding carbodiimides into the latex. The film characteristics are as shown in Table 10.

TABLE 10

|  | Ex. 24 | Ex. 25 | Ex. 26 | Ex. 27 |
|---|---|---|---|---|
| Pot life | 1 hr | 24 hr | 48 hr | 168 hr |
| Physical Properties |  |  |  |  |
| Thickness, mm | 0.08 | 0.08 | 0.08 | 0.08 |
| TS, MPa | 40-42 | 34-41 | 35-44 | 24-31 |
| M300, MPa | 3.8-4 | 2.6-3.2 | 2.6-3.3 | 2.3-2.5 |
| M500, MPa | 16.5 | 7.8-12.5 | 9.5-12.5 | 5.8-7.2 |
| Eb, % | 600 | 550-600 | 600-650 | 650-700 |
| LS-c, % | 89 | 89 | 85 | 100 |
| Durability, min | >180 | >180 | >180 | >120 |

Film linear swelling in cyclohexanone (LS-c);
Durability = time taken for a glove to disintegrate, break up or tear (especially at crotches) after wearing under actual working conditions.

From the foregoing disclosure and detailed description of certain embodiments, it will be apparent that various modifications, additions and other alternative embodiments are possible without departing from the true scope and spirit of the invention. For example, in certain embodiments zinc oxide can be used in combination with the first compound and second compound without significant effect on the resulting polymer article. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:
1. A method of making a standalone polymer article comprising, in combination, the steps of:
  making a self-crosslinking polymer solution by mixing, at 30° C. to 40° C. for only 0.5 hour to 2 hours, a first compound containing oligocarbodiimide groups or polycarbodiimide groups, a second compound containing carboxylated groups, initially a pH adjuster consisting of ammonium hydroxide, and an antioxidant comprising a butylated reaction product of p-cresol and cyclopentadiene, the polymer solution free of any additional crosslinking agents and any accelerators;

applying the self-crosslinking polymer solution to a former, wherein the step of applying occurs within 2 hours of the making of the self-crosslinking polymer solution;

drying the self-crosslinking polymer solution to form a wet gel;

treating the wet gel of the self-crosslinking polymer solution with a mild organic acid and pre-leaching the wet gel coated former in water to remove the pH adjuster;

curing the self-crosslinking polymer solution for 8 minutes to 20 minutes in an oven at a temperature within a range of from 80° C. to 130° C. to form a cured carboxylated nitrile latex, the cured carboxylated nitrile latex free of any additional crosslinking agents and any accelerators; and leaching the cured carboxylated nitrile latex for 50 seconds to no more than 120 seconds in water at 50° C. to 60° C. to form the standalone polymer article, wherein a film breakthrough leak time in cyclohexanone is more than 330 minutes.

2. The method of claim 1, wherein applying the self-crosslinking polymer solution to a former comprises dipping the former into the self-crosslinking polymer solution.

3. The method of claim 1, wherein the self-crosslinking polymer solution further comprises demineralized water.

4. The method of claim 1, further comprising pretreating the former with a precoat, wherein the precoat comprises at least a surfactant, a release agent and an ionic solution.

5. The method of claim 1, further comprising stripping the standalone polymer article from the former.

6. The method of claim 1, wherein applying the self-crosslinking polymer solution to the former occurs within 1 hour of the step of making the self-crosslinking polymer solution.

7. The method of claim 6, wherein applying the self-crosslinking polymer solution to the former occurs within 30 minutes of the step of making the self-crosslinking polymer solution.

8. The method of claim 1, wherein curing the self-crosslinking polymer solution lasts 12 minutes to 16 minutes.

9. The method of claim 1, wherein leaching the cured carboxylated nitrile latex is for 50 seconds to 70 seconds after curing.

10. The method of claim 1, wherein curing the self-crosslinking polymer solution is performed at a temperature within the range of from 80° C. to 90° C.

11. A standalone polymer article formed from a cured carboxylated nitrile latex, comprising, in combination:

a reaction product of a first compound containing oligo-carbodiimide groups or polycarbodiimide groups and a second compound containing carboxylated groups; and an antioxidant comprising a butylated reaction product of p-cresol and cyclopentadiene, the cured carboxylated nitrile latex free of any additional crosslinking agents and any accelerators, wherein the standalone polymer article is formed from a self-crosslinking polymer solution matured at 30° C. to 40° C. for only 0.5 hour to 2 hours and comprising the first compound, the second compound, the antioxidant, and initially, a pH adjuster consisting of ammonium hydroxide, wherein the self-crosslinking polymer solution is dried to form a wet gel, and wherein the wet gel of the self-crosslinking polymer solution is treated with a mild organic acid and subjected to a pre-leaching process to remove the pH adjuster, subjected to a curing process for 8 minutes to 20 minutes in an oven at a temperature of from 80° C. to 130° C. to form the cured carboxylated nitrile latex, and subjected to an additional leaching process for 50 seconds to no more than 120 seconds in water at 50° C. to 60° C. to form the standalone polymer article, wherein a film breakthrough leak time in cyclohexanone is more than 330 minutes.

12. The standalone polymer article of claim 11, wherein the cured carboxylated nitrile latex further comprises at least one pigment.

13. The standalone polymer article of claim 11, wherein the first compound comprises a polycarbodiimide terminated with diisocyanates, the diisocyanates selected from the group consisting of tetramethylxylylene diisocyanate, isophorone diisocyanate, 4,4'-dicycohexylmethane diisocyanate, toluene-2,4-diisocyanate, toluene-2,6-diisocyanate, diphenylmethane-4,4-diisocyanate, 1,4-phenylene-diisocyanate, dicyclohexylmethane-4,4'-diisocyanate, 3-isocyanatomethyl-3,3,5-trimethylcyclohexylisocyanate, 1,6-hexyldiisocyanate, 1,4-cyclohexyl-diisocyanate, norbonyldiisocyanate, 1,5-naphthylene diisocyanate, 4,4-diphenyldimethylmethane diisocyanate, 1,3-phenylene diisocyanate, hexamethylene diisocyanate, xylylene diisocyanate, and methylcyclohexane diisocyanate.

14. The standalone polymer article of claim 11, wherein the standalone polymer article is a thin wall article having a thickness of 0.03 mm to 0.33 mm.

15. The standalone polymer article of claim 11, wherein the temperature is within a range of 80° C. to 90° C.

16. The standalone polymer article of claim 15, wherein a thickness of the standalone polymer article is within the range of from 0.03 mm to 0.33 mm.

17. The standalone polymer article of claim 11, wherein a tensile strength of the standalone polymer article is in the range of 21 MPa to 44 MPa.

18. The standalone polymer article of claim 11, wherein the standalone polymer article is a glove, a finger cot, a condom, a balloon, a bladder bag, a catheter, tubing, a rubber band, a tourniquet, an elastic band, a diaphragm, a dental dam, or a sheath.

19. The standalone polymer article of claim 11, wherein a tensile strength of the standalone polymer article at 500% strain (M500) is within a range of from 2.7 MPa to 36 MPa.

20. The standalone polymer article of claim 11, wherein elongation at break of the standalone polymer article is within a range of 650% to 750%.

21. The standalone polymer article of claim 11, wherein a film linear swell in hexane of the standalone polymer article is less than 4%.

22. The standalone polymer article of claim 11, wherein a film linear swell in toluene of the standalone polymer article is less than 85%.

23. The standalone polymer article of claim 11, wherein a film linear swell in cyclohexanone of the standalone polymer article is less than 135%.

24. The standalone polymer article of claim 11, wherein a film linear swell in acetone of the standalone polymer article is less than 50%.

* * * * *